(12) United States Patent
Sugiyama (10) Patent No.: US 6,594,732 B1
(45) Date of Patent: Jul. 15, 2003

(54) COMPUTER SYSTEM WITH MEMORY SYSTEM IN WHICH CACHE MEMORY IS KEPT CLEAN

(75) Inventor: Noriaki Sugiyama, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/466,601

(22) Filed: Dec. 17, 1999

(30) Foreign Application Priority Data

Dec. 22, 1998 (JP) .......................................... 10/364299

(51) Int. Cl.⁷ .............................................. G06F 13/14
(52) U.S. Cl. ....................... 711/143; 711/144; 711/158; 710/35; 710/244
(58) Field of Search ........................ 711/143–146, 105, 711/203, 211, 217–218, 135, 150–151, 158–159, 168, 3; 710/35, 40, 107, 113–116, 119, 111, 121–123, 240, 244, 264; 365/189.07, 203–204, 221, 230.06, 230.08–230.09, 235, 238.5, 239

(56) References Cited

U.S. PATENT DOCUMENTS

| | | | |
|---|---|---|---|
| 5,353,423 A | * 10/1994 | Hamid et al. ................ | 711/143 |
| 5,699,548 A | * 12/1997 | Choudhury et al. ........ | 711/143 |
| 5,768,558 A | * 6/1998 | Iyengar et al. .............. | 711/143 |
| 5,860,110 A | * 1/1999 | Fukui et al. ................. | 711/141 |
| 6,404,691 B1 | * 6/2002 | Fujishima et al. ..... | 365/230.03 |

FOREIGN PATENT DOCUMENTS

| | | |
|---|---|---|
| JP | 4-69750 | 3/1992 |
| JP | 4-340145 | 11/1992 |
| JP | 5-20195 | 1/1993 |
| JP | 6-309231 | 11/1994 |
| JP | 7-160577 | 6/1995 |
| JP | 7-271666 | 10/1995 |

* cited by examiner

*Primary Examiner*—Matthew Kim
*Assistant Examiner*—Denise Tran
(74) *Attorney, Agent, or Firm*—Scully, Scott, Murphy & Presser (57) ABSTRACT

A computer system includes a host bus, a CPU connected to the host bus, a main memory connected to the host bus, a cache memory and a memory controller. The cache memory is connected to at least one of the host-bus and the CPU, and stores cache data. A tag address and a flag are provided for each of the cache data and the flag indicates one of a clean state in which the corresponding cache data is written back into the main memory and a dirty state in which the corresponding cache data is not yet written back into the main memory. The memory controller is connected to the host bus, the cache memory and the main memory. The memory controller writes back dirty write back cache data into the main memory in a continuous write back mode, when the host bus is not used, wherein the dirty write back cache data is a part of the cache data stored in the cache memory, and each of the dirty write back cache data is not written back and includes a predetermined portion in the tag address.

20 Claims, 4 Drawing Sheets

COMPUTER SYSTEM WITH MEMORY SYSTEM IN WHICH CACHE MEMORY IS KEPT CLEAN

BACKGROUND OF THE INVENTION

1. Field of the Invention

The present invention relates to a computer system. More particularly, the present invention relates to a computer system having a memory system having a write back type cache memory.

2. Description of the Related Art

In a memory system for a high speed operation, SRAM (Synchronous DRAM) is typically used for a cache memory, DRAM is used for a main memory, and a write back system is employed.

In the write back system, there is a case that a data written in the cache memory is not immediately written back to the main memory so that a device (hereafter, referred to as a processor) can carry out a memory access at high speed. Accordingly, the cache memory and the main memory sometimes have data different from each other. This inconsistent state is referred to as a "dirty" state. On the contrary, the consistent state is referred to as a "clean" state.

FIGS. 1A to 1H show the write back operation in a typical computer system with a main controller. Referring to FIGS. 1A to 1H, a main controller typically expects a page hit to the main memory, and waits for a next memory access without carrying out the access while keeping the same row address active. This is carried out not only in the case of the write back operation, but also after the end of the main memory access. This is because the access can be carried out from a column cycle without need of a pre-charging operation, if an access to the same row address, i.e., the page hit occurs. Upon occurrence of an access of page miss, the row address is switched in accordance with the standard of DRAM. In this case, a RAS signal (row address strobe signal) is again outputted, i.e., the pre-charging operation is carried out again, and then the access is carried out.

It is necessary to carry out the write back operation to the main memory in case of a cache memory miss hit. In this case, a data to be abandoned in order to store a new data in the cache memory is written in the main memory. The write back operation to the main memory is carried out under a control of a memory controller, and carried out to only a cache memory area in the dirty state. This write back operation must be always carried out in order to write a correct data to the main memory. For this reason, the write back operation can not be interrupted even if a new memory access is requested from a CPU during the write back operation. Thus, the write back operation occupies a memory bus for a period of the write back operation. Therefore, it is not effective to carry out the write back operation for each cache memory miss hit, even if it is necessary. The reason is that a necessary process can not be forwarded while the write back operation is carried out.

The proposals to improve an efficiency of a computer system using the write back type cache memory are disclosed in Japanese Laid Open Patent Application (JP-A-Heisi 4-69750), Japanese Laid Open Patent Application (JP-A-Heisi 6-309231) and the like.

In the Japanese Laid Open Patent Application (JP-A-Heisei 5-20195), a page mode is used to carry out the write back operation. In the Japanese Laid Open Patent Application (JP-A-Heisei 4-69750), the write back operation and a reading out operation are continuously carried out if the write back operation and the reading out operation have the same row address. However, these two conventional examples are intended to improve the efficiency of the write back operation itself. They can not solve the problem that the necessary process can not be carried out while the write back operation is carried out.

In the Japanese Laid Open Patent Application (JP-A-Heisei 6-309231), an empty time of a bus is used to carry out the write back operation. If the write back operation is carried out by use of the empty time of the bus, the efficiency of the computer system can be improved as a whole because other processes are not disturbed. However, in the Japanese Laid Open Patent Application (JP-A-Heisei 6-309231), the write back operation using the empty time of the bus is autonomously started in a predetermined period. That is, it is checked whether or not the bus is empty, at every predetermined period. If the bus is empty, the write back operation is carried out. On the contrary, if the bus is not empty, the write back operation is not carried out, and the operational flow waits for a next period. For this reason, it is necessary to periodically check whether or not the bus is empty. Moreover, the write back operation itself is carried out by use of a procedure similar to the conventional write back operation. Thus, it does not improve the efficiency of the write back operation itself. Furthermore, the write back operation is not carried out if the bus is not empty. Hence, it is impossible to cope with the cache memory areas at the dirty state surely and quickly.

In conjunction with the above description, a DRAM control system is described in Japanese Laid Open Patent Application (JP-A-Heisei 7-271666). In the reference, there are two registers: one storing an address data in a range of the line size of a cache memory and the other storing an address data out of the range of the line size of the cache memory. When a snoop process is generated, an address information on a bus is held by the two registers and an active command is inputted. When the write back cycle is generated, only the address data in a range of the line size of the cache memory is held by the register and a write command is inputted. Thus, the active command to a synchronous DRAM can be inputted during the snoop process before the access to a main memory unit by a bus master is started. Therefore, when the write back cycle is carried out, the active command can be omitted, resulting in improvement of efficiency.

SUMMARY OF THE INVENTION

Therefore, an object of the present invention is to provide a computer system with a memory system having a write back type cache memory.

Another object of the present invention is to provide a computer system with a memory system in which a cache line in a write back type cache memory can be kept as clean as possible.

In order to achieve an aspect of the present invention, a computer system includes a host bus, a CPU connected to the host bus, a main memory connected to the host bus, a cache memory and a memory controller. The cache memory is connected to at least one of the host bus and the CPU, stores cache data. A tag address and a flag are provided for each of the cache data and the flag indicates one of a clean state in which the corresponding cache data is written back into the main memory and a dirty state in which the corresponding cache data is not yet written back into the main memory. The memory controller is connected to the host bus, the cache memory and the main memory. The memory controller writes back dirty write back cache data into the main memory in a continuous write back mode, when the host bus is not used, wherein the dirty write back cache data is a part of the cache data stored in the cache memory, and each of the dirty write back cache data is not written back and includes a predetermined portion in the tag address.

The CPU accesses the cache memory or the main memory in a memory access using the host bus, and the predetermined portion is a row address of a physical address in the latest memory access. It is preferable that the memory controller holds the row address in the continuous write back mode.

The memory controller may cancel the continuous write back mode when the CPU accesses the cache memory or the main memory in a memory access using the host bus. In this case, the memory controller includes an address decoder connected to the host bus. The address decoder decodes a logical address on the host bus into a physical address and detects the memory access by the CPU. The memory controller cancels the continuous write back mode when the memory access is detected by the address decoder. In this case, the predetermined portion may be a row address of the physical address in the latest memory access. Also, the memory controller may hold the row address in the continuous write back mode.

In addition, the memory controller sequentially generates cleaning physical addresses while updating a column address, in the continuous write back mode. Each of the cleaning physical addresses includes the row address and the updated column address. The memory controller writes back the dirty write back cache in the main memory based on the generated cleaning physical addresses, and the tag addresses and the flags corresponding to the dirty write back cache data. In this case, the memory controller updates the column address immediately when the cleaning physical address does not hit to any of the tag addresses, or when the cleaning physical address hits to one of the tag addresses but the flag corresponding to the hit tag address indicates that the corresponding cache data is in the clean state, and after the writing back operation of the dirty write back cache data in the main memory when the cleaning physical address hits to one of the tag addresses corresponding to the one dirty write back cache data and the flag corresponding to the one dirty write back cache data indicates that the one dirty write back cache data is in the dirty state.

Also, the computer system may further include a bus arbiter connected to the host bus. The bus arbiter detects that the host bus is not used, and the memory controller sets the continuous write back mode.

The memory controller may detect that the host bus is not used, and sets the continuous write back mode.

In order to achieve another aspect of the present invention, a memory system includes a host bus, a main memory connected to the host bus, a cache memory and a memory controller. The cache memory stores cache data. A tag address and a flag are provided for each of the cache data and the flag indicates one of a clean state in which the corresponding cache data is written back into the main memory and a dirty state in which the corresponding cache data is not yet written back into the main memory. The memory controller is connected to the host bus, the cache memory and the main memory. The memory controller writes back dirty write back cache data into the main memory in a continuous write back mode, when the host bus is not used, wherein the dirty write back cache data is a part of the cache data stored in the cache memory, and each of the dirty write back cache data is not written back and includes a predetermined portion in the tag address.

In this case, the memory controller may include an address decoder and a controller. The address decoder is connected to the host bus. The address decoder decodes a logical address on the host bus into a physical address and detects that the host bus is used. The controller cancels the continuous write back mode when it is detected by the address decoder that the host bus is used. In this case, the predetermined portion may be a row address of the physical address in the latest memory access, and the controller may issue generation control signals in the continuous write back mode. The memory controller includes a latch circuit holding the row address, and an address generator. The address generator is responsive to the generation control signals to generate cleaning physical addresses while updating a column address, in the continuous write back mode, respectively, each of the cleaning physical addresses including the row address and the updated column address. Also, the memory controller includes an address comparator comparing the cleaning physical address and one of the tag addresses and generating one of a cache hit signal or a cache miss hit signal based on the comparing result. The controller generates the generation control signal each time the cache miss hit signal is outputted from the address comparator or each time the cache hit signal is outputted from the address comparator but the flag corresponding to the cache hit signal indicates the clean state, and after one of the dirty write back cache data is written back in the main memory when the cache hit signal is outputted from the address comparator and the flag corresponding to the cache hit signal indicates the dirty state.

In addition, the memory controller may include a selector selecting the physical address outputted from the address decoder when the continuous write back mode is not set, and selecting the cleaning physical address generated by the address generator when the continuous write back mode is set.

In order to achieve still another aspect of the present invention, a method of keeping a cache memory clean in a computer system comprising the cache memory and a main memory which are both connected to a host bus, the cache memory storing cache data, wherein a tag address and a flag are provided for each of the cache data and the flag indicates one of a clean state in which the corresponding cache data is written back into the main memory and a dirty state in which the corresponding cache data is not yet written back into the main memory. The method includes:

setting a continuous write back mode when the host bus is not; and writing back dirty write back cache data into the main memory in the continuous write back mode, wherein the dirty write back cache data is a part of the cache data stored in the cache memory, and each of the dirty write back cache data is not written back and includes a predetermined portion in the tag address.

Here, the continuous write back mode is cancelled when the host bus is used for a memory access to the cache memory or the main memory. In the canceling, use of the host bus is detected based on a logical address on the host bus, the logical address being decoded into a physical address.

Also, the predetermined portion may be a row address of the physical address in the latest memory access. In the writing back, the row address is held in the continuous write back mode. Also, generation control signals are responded to sequentially generate cleaning physical addresses while updating a column address, in the continuous write back mode, respectively, each of the cleaning physical addresses including the row address and the updated column address.

Moreover, in the writing back, the cleaning physical address and one of the tag addresses are compared with each other, and one of a cache hit signal or a cache miss hit signal is generated based on the comparing result. The generation control signal is generated each time the cache miss hit signal is outputted from the address comparator or each time the cache hit signal is outputted from the address comparator but the flag corresponding to the cache hit signal indicates the clean state, and after one of the dirty write back cache data is written back in the main memory when the cache hit signal is outputted from the address comparator and the flag corresponding to the cache hit signal indicates the dirty state.

The method may further includes:

selecting the physical address obtained from the logical address when the continuous write back mode is not set; and selecting the cleaning physical address when the continuous write back mode is set.

BRIEF DESCRIPTION OF THE DRAWINGS

FIGS. 1A to 1H are timing charts showing a write back operation in a conventional computer system with a memory system having a write back type cache memory;

FIGS. 4A to 4H are timing charts showing a write back operation of the computer system with the memory system according to the present invention.

DESCRIPTION OF THE PREFERRED EMBODIMENTS

Hereinafter, a computer system with a memory system having a write back type cache memory of the present invention will be described below with reference to the attached drawings.

Figure 1A:
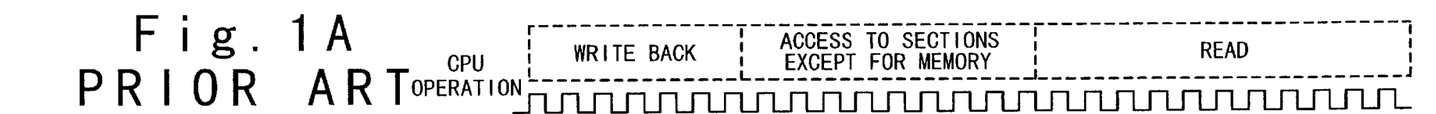
Figure 1B:
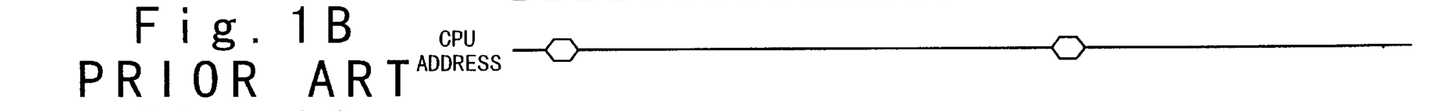
Figure 1C:
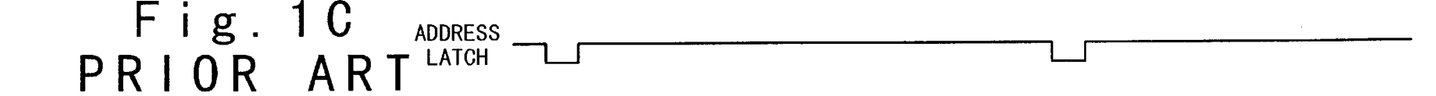
Figures 1D, 1E:
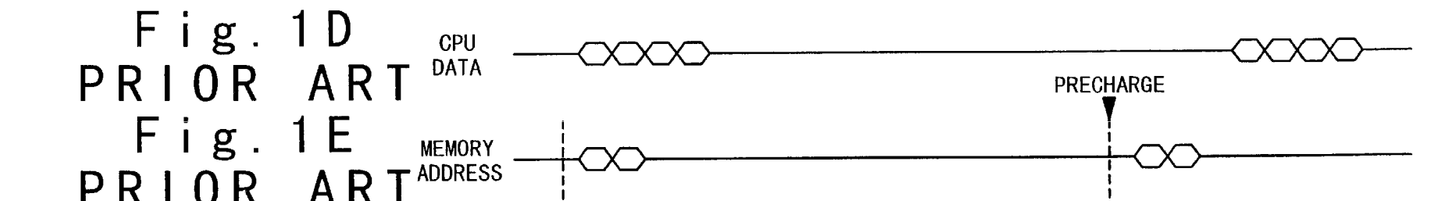
Figure 1F:
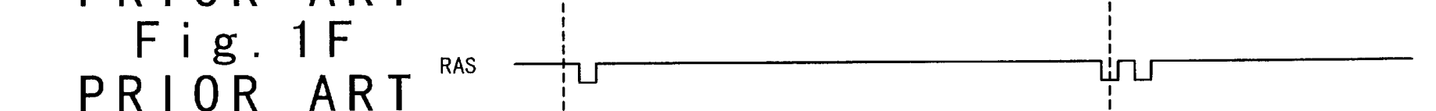
Figure 1G:
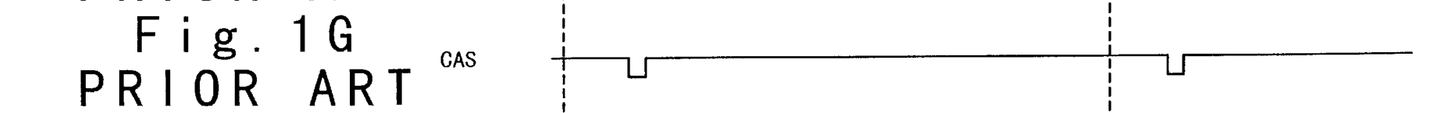
Figure 1H:
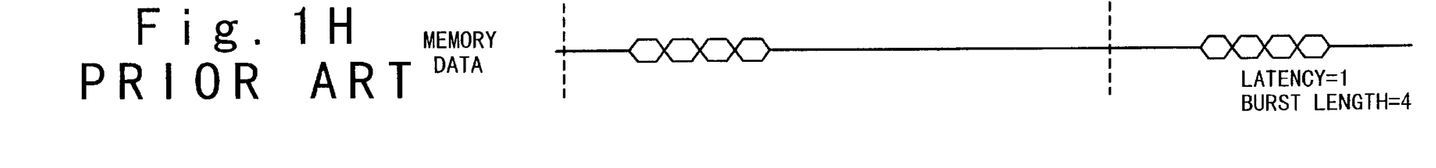
Figure 2:
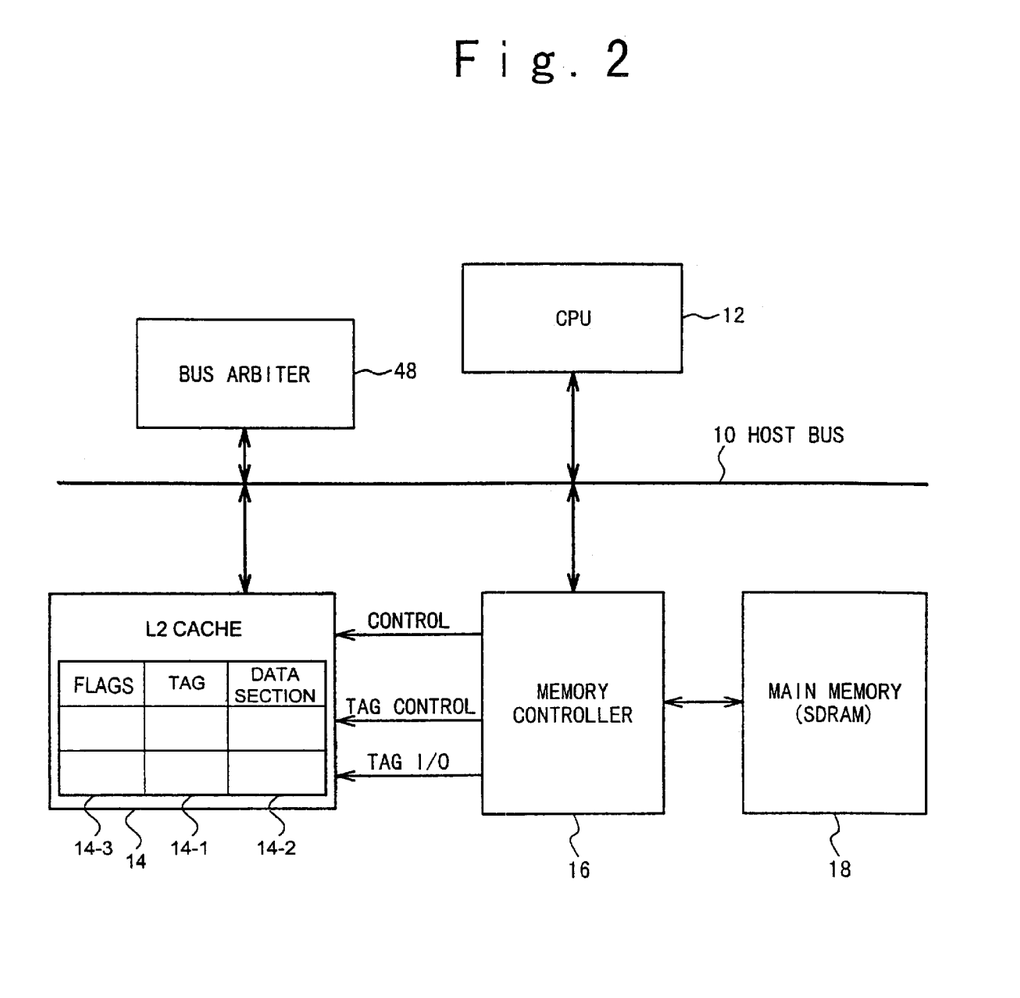
FIG. 2 is a block diagram showing a whole configuration in a computer system with a memory system having a write back type cache memory according to the present invention.

FIG. 2 is a block diagram showing a whole configuration of the computer system with the memory system according to the present invention. Referring to FIG. 2, a host bus 10 is provided with an address bus and a data bus, and a control bus is included in the address bus. A CPU 12 and a memory controller 16 are connected to both the address bus and the data bus in the host bus 10. A cache memory 14 is connected to only the data bus of the host bus 10. It should be noted that the CPU 12 and the cache memory 14 may be connected to each other through a bus dedicated to a cache memory. The memory controller 16 sends only an address to the cache memory 14. A main memory 18 has a quick page access mode and is controlled by the memory controller 16. The main memory 18 receives an address from the memory controller 16. Moreover, the main memory 18 receives a data through the memory controller 16, and outputs a data through the memory controller 16. In the example shown in FIG. 2, the main memory itself is composed of SDRAM. A bus arbiter 48 is connected to the host bus 10. The bus arbiter 48 determines whether or not the main memory access is ended, by use of various methods. For example, the bus arbiter 48 determines a kind of access after reception of the address. The bus arbiter 48 monitors or counts the number of clocks. When the count reaches a value determined based on the kind of the access, the bus arbiter 48 determines that the main memory access is end. Or, after the reception of the address, the number of clocks is counted. When the count reaches a predetermined maximum clock number within the necessary clock number until the end of each type of access, the bus arbiter 48 determines that the main memory access is end. In the latter case, a slightly useless cycle is brought about.

Figure 3:
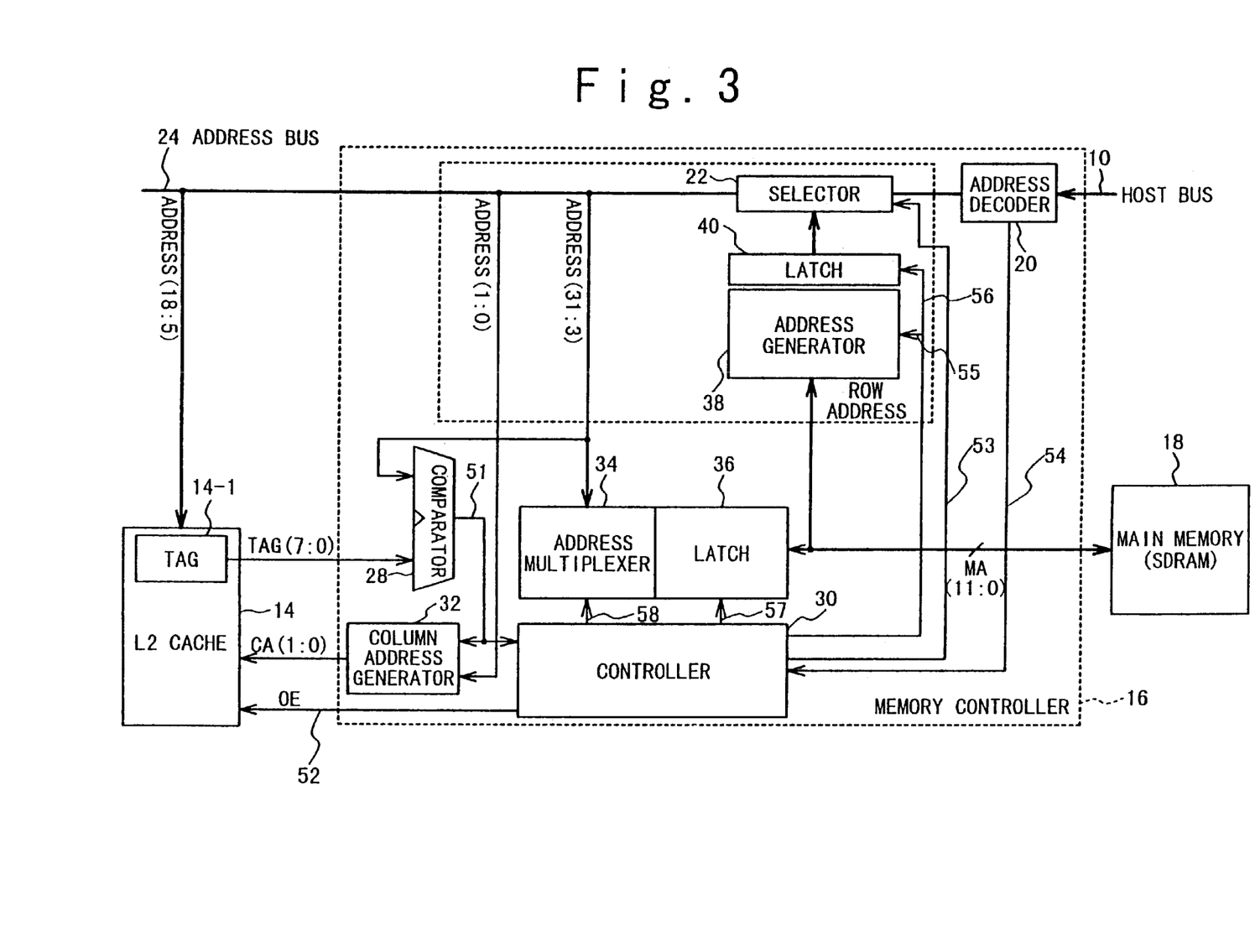
FIG. 3 is a block diagram showing a memory controller in the memory system according to the present invention.

FIG. 3 shows a block diagram of the memory controller 16 in the computer system according to the present invention. The memory controller 16 according to the present invention shown in FIG. 3 is composed of an address decoder 20, a selector 22, an address bus 24, an address comparator 28, a controller 30, a column address generator 32, an address multiplexer 34, a latch circuit 36, an address generator 38, and a latch circuit 40. The cache memory 14 has a tag region 14-1. Thus, in the memory controller 16 of the present invention, the selector 22, the address generator 38 and the latch circuit 40 are added to a conventional memory controller. Thus, the known portions in the conventional memory controller having no direct relation to the memory operation peculiar to the present invention are omitted or simplified to simplify the drawings. Especially, FIG. 3 shows only the portions having relation to an address, and the portions having relation to data is omitted, since it is not changed from the conventional memory controller. Hence, the data bus is omitted. Moreover, many control signals having relation to data transfer are omitted.

The address decoder 20 receives a virtual address or a logical address on the host bus 10 and outputs a physical address to the selector 22. The selector 22 is connected to an address bus 24. The selector 22 receives the physical addresses from the address decoder 20 and the latch circuit 40 and selectively outputs one of the physical addresses onto the address bus 24 in response to a selection control signal 53 from the controller 30. The cache memory 14 is connected to the address bus 24. The cache memory 14 is divided into a data section 14-2, the tag region 14-1, and a flags section 14-3. The tag region 14-1 stores tag addresses for a plurality of cache data 14-2. The flags section 14-3 of the cache memory 14 stores a dirty/clean flag and a valid/invalid flag for each cache data 14-2. The dirty/clean flag indicates whether the cache data is clean. The valid/invalid flag indicates whether the cache data can be used.

The memory controller 16 further has the address comparator 28. This address comparator 28 compares the physical address on the address bus 24 and the address stored in the tag region 14-1 of the cache memory 14. When both the addresses are coincident with each other, the address comparator 28 outputs a cache hit signal 51 to the controller 30 and the column address generator 32. Upon receipt of the cache memory hit signal 51, the column address generator 32 receives a column address (1:0) of the physical address on the address bus 24, and outputs a column address CA (1:0) to the cache memory 14.

The controller 30 checks whether or not the cache hit signal 51 is outputted from the address comparator 28. If the cache hit signal 51 is outputted, the controller 30 outputs an output enable signal OE 52 to the cache memory 14. Moreover, the controller 30 generates the selection control signal 53 based on the cache hit signal 51 to output to the selector 22. When receiving a signal 54 indicative of a change of an address from the address decoder 20, namely, the signal indicative of a receipt of a new main memory access, the controller 30 outputs the selection control signal 53 to the selector 22 so as to output the physical address of the address decoder 20 onto the address bus 24.

Moreover, the memory controller 16 has an address multiplexer 34. The address multiplexer 34 receives the physical address (31:3) from the address bus 24 in response to a multiplex control signal from the controller 58, and divides into a row address and a column address. The addresses outputted in order from the address multiplexer 34 are latched by the latch circuit 36 in response to a latch control signal 57 from the controller 30. The memory address MA (11:0) latched by the latch circuit 36 is sent to the main memory 18. Moreover, when the row address is latched by the latch circuit 36, the latched row address is sent to the address generator 38. The address generator 38 generates a physical address based on the row address in response to a generation control signal 55 from the controller 30. The generated physical address is supplied and latched by the latched circuit 40 in response to a latch control signal 56 from the controller 30. The address latched by the latch circuit 40 is supplied to the selector 22, as described above.

As mentioned above, the memory controller 16 according to the present invention shown in FIG. 3 is constituted by adding the selector 22, the address generator 38 and the latch circuit 40 to the conventional memory controller. Thus, the memory controller 16 is operated similarly to the conventional memory controller other than the operation having relation to the added components.

The operation of the computer system of the present invention will be described below.

If the cache memory hit would occur in a memory read access of the CPU 12, the memory controller 16 is operated similarly to the conventional memory controller. That is, the address decoder 20 receives a logical address for a new main memory access to generate the signal 54 to the controller 30. Also, the address decoder 20 decodes the logical address to generate a physical address. The controller 30 controls the selector 22 in response to the signal 54 to select and output the physical address from the address decoder 20 onto the address bus 24. The address comparator 28 compares the physical address on the address bus 24 with the addresses stored in the tag region 14-1 of the cache memory 14. When the physical address on the address bus 24 is coincident with one of the tag addresses, the address comparator 28 outputs the cache memory hit signal 51 to the controller 30 and the column address generator 32. The column address generator 32 receives the column address (1:0) of the physical address on the address bus 24 in response to the cache memory hit signal 51, and outputs the column address CA (1:0) to the cache memory 14. The controller 30 outputs the output enable signal OE to the cache memory 14 in response to the cache memory hit signal 51 from the address comparator 28. As a result, the data is outputted from the cache memory 14 to the CPU 12.

If the cache memory miss hit would occur in the memory read access by the CPU 12, the write back operation to the main memory 18 is carried out similarly to the conventional example. Since the configuration necessary for such an operation is conventionally known as mentioned above, it is omitted in FIG. 3.

In this case, the address decoder 20 receives the address for the new main memory access to generate the signal 54 to the controller 30. Also, the address decoder 20 decodes the logical address to generate the physical address. The controller 30 controls the selector 22 in response to the signal 54 to select and output the physical address from the address decoder 20 onto the address bus 24. The address comparator 28 compares the physical address on the address bus 24 with the tag addresses stored in the tag region 14-1 of the cache memory 14. As a result, the address comparator 28 outputs a cache memory miss hit signal 51 to the controller 30 and the column address generator 32.

The controller 30 searches the tag region 14-1 for the oldest updated data in response to the cache memory miss hit signal 51 by use of the conventional known operation. There are known many algorithms for update of the cache memory. Therefore, another algorithm may be used. The controller 30 refers to the dirty/clean flag corresponding to the oldest updated data. When the dirty/clean flag indicates that the oldest updated data is clean, the controller 30 generates the signals 58 and 57 to control the address multiplexer 34 and the latch circuit 36 such that the physical address on the address bus 24 is outputted to the main memory 18 in an order of the row address and the column address. As a result, the data corresponding to the physical address in the main memory 18 is outputted to the host bus 10. At that time, the data is sent to the cache memory 14 as well as the CPU 12, and written in the cache memory 14. On the other hand, the physical address on the address bus 24 is written to the tag region 14-1 as the tag address. Moreover, the dirty/clean flag is reset at a clean state, and the valid/invalid flag is set at a valid state.

Next, a case where the dirty/clean flag corresponding to the oldest updated data indicates the dirty state will be described below. In this case, the following operation is carried out before the above-mentioned operation in the case that the dirty/clean flag is clean.

As shown in FIGS. 4A to 4H, when the oldest updated data is dirty, it is necessary to write back the cache data of the cache memory 14 into the main memory 18. The controller 30 generates the signals 58 and 57 to control the address multiplexer 34 and the latch circuit 36 such that a tag address as a main memory address from the tag region 14-1 is latched through the address bus 24 and the address multiplexer 34. Further, the controller 30 outputs the latched main memory address to the main memory 18 in the order of the row address and the column address. The oldest updated data is outputted from the cache memory 14 to the main memory 18. As a result, the write back operation to the main memory 18 is carried out. Subsequently, the controller 30 carries out the operation similar to operation when the oldest updated data of the cache memory 14 is clean. In this way, the data of the main memory 18 is outputted to the host bus 10 and supplied to the CPU 12. Also, the data is written to the cache memory 14.

The above-mentioned operation is the write back operation. Thereafter, an operation associated with the present invention is carried out in a continuous write back mode.

That is, following the write back operation resulting from the cache memory miss hit, the controller 30 of the present invention determines whether or not the main memory access is ended. In this example, the bus arbiter 48 detects the end of the main memory access and outputs a main memory access end signal (not shown) to the controller 30. However, the controller 30 may have the functions of the bus arbiter 48. In this case, the main memory access end signal is unnecessary.

Figures 4A, 4B, 4C:
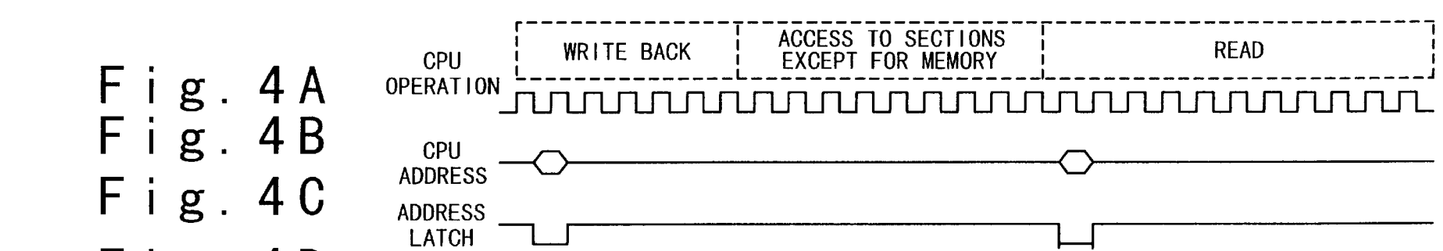
Figure 4D:
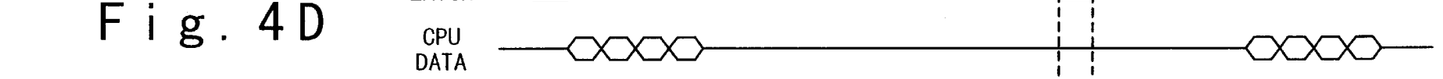
Figures 4E, 4F, 4G:
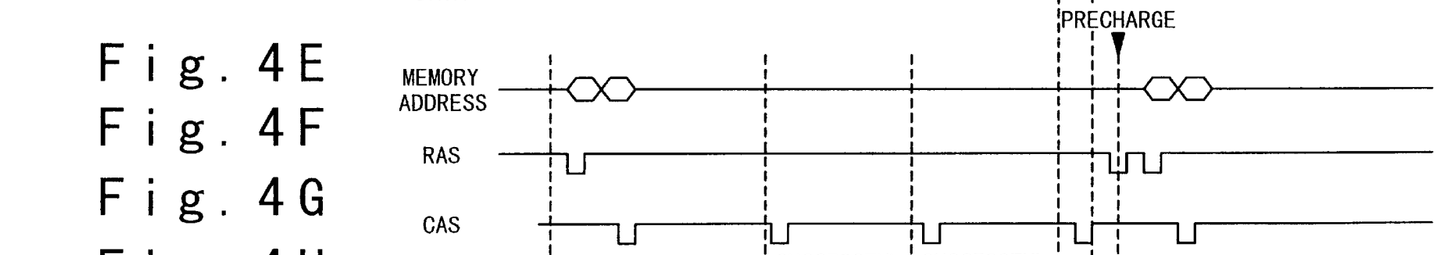
Figure 4H:
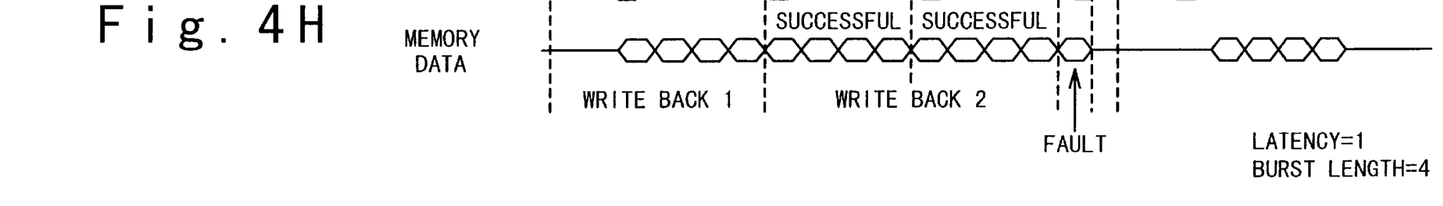

After the end of the main memory access is detected as mentioned above, the controller 30 issues the generation control signal 55. That is, the controller 30 controls the address generator 38 to generate a new address corresponding to a row address of the physical address immediately before the end of the main memory access. The latch circuit 40 latches the generated physical address in response to the latch signal 56 from the controller 30. Also, the controller 30 outputs the selection control signal 53 to the selector 22 such that the physical address latched in the latch circuit 40 is outputted to the address bus. Here, the new physical address has the same row address and a different column address, as shown FIGS. 4F and 4G. The different column address has an initial value. Then, the different column address is sequentially incremented, as described below.

The address comparator 28 compares the physical address on the address bus 24 with the tag addresses stored in the tag region 14-1 of the cache memory 14. As a result, when the cache memory miss hit signal 51 is outputted to the controller 30, the controller 30 issues the generation control signal 55 to the address generator 38. The address generator 38 generates a new address composed of the row address and an incremented new column address. The row address is equal to that of the address immediately before the end of the main memory access. The column address is obtained by incrementing the above column address. Then, the controller 30 issues the latch control signal 56 and the selection control signal 53 to the latch circuit 40 and the selector 22, respectively. Thus, the address comparator 28 again compares the physical address on the address bus 24 with the tag addresses stored in the tag region 14-1 of the cache memory 14. As the compared result, it is supposed that the cache memory hit signal 51 is outputted to the controller 30. In this case, if the dirty/clean flag is clean, the controller 30 again issues the generation control signal 55, the latch control signal 56, and the selection control signal 53 to the address generator 38, the latch circuit 40 and the selector 22, respectively. As a result, a new physical address is generated by the address generator 38. Here, the column address is further incremented.

Next, as the compared result, it is supposed that the cache memory hit signal 51 is outputted to the controller 30. Also, it is supposed that the dirty/clean flag is dirty. In this case, as shown in FIGS. 4A to 4H, the controller 30 controls the address multiplexer 34 and the latch circuit 36 such that the latch circuit 36 latches the main memory address on the address bus 24 through the address multiplexer 34. Then, the controller 30 controls the latch circuit 36 to output the main memory address to the main memory 18 in the order of the row address and the column address. The data of the cache memory 14 corresponding to the hit address is outputted to the main memory 18. Thus, the write back operation to the main memory 18 is carried out. Subsequently, the dirty/clean flag of the flags region 14-3 is reset to the clean state. Accordingly, one cache memory line at the dirty state can be changed into the clean state. Accordingly, one cache memory line at the dirty state can be changed into the clean state.

In succession, the controller 30 issues the generation control signal 55, the latch control signal 56, and the selection control signal 53 to the address generator 38, the latch circuit 40 and the selector 22. The address generator 38 generates a new address composed of the same row address and the further-incremented column address.

The above-mentioned cycles are continued until the memory controller 16 receives a new main memory access. That is, it is supposed that the address decoder 10 receives a new main memory address, as shown in FIGS. 4A to 4H. In this case, the address decoder 10 outputs the signal 54 indicative of the reception of the new main memory access to the controller 30. The controller 30 issues the selection control signal 53 to the selector 22 to control the selector 22 to output the physical address decoded by the address decoder 10 on to the address bus 24. Consequently, the write back operation of the cache memory 14 is immediately ended. This is, the operation corresponding to failure of a cleaning operation of a memory data is stopped. Thus, if the memory controller 16 receives the new main memory access, the write back operation of the present invention is immediately ended. Hence, the main memory is not disturbed at all.

As mentioned above, following the write back operation resulting from the cache memory miss hit, the memory controller 16 according to the present invention selectively carries out the write back operation after the end of the main memory access. In the above, if a cache memory line indicated by the tag is dirty, the write back operation is carried out in succession while the row address is fixed to be active. Also, after the end of the write back operation according to the present invention, the memory controller sets the dirty/clean flag to the clean state. This process is performed on all the lines which correspond to the same row address in the cache memory, and in which the dirty/clean flags indicate the dirty state.

On the other hand, if a new memory access resulting from the CPU 12 occurs during the period of the write back operation according to the present invention, the write back operation according to the present invention is immediately ended. Then, the dirty bit in its line ends while maintaining its dirty state. At this time, data in the main memory is re-written until the middle of the cache memory line. However, since the cache memory line is kept dirty, the memory data may be re-written until the middle. Thus, the conventional access is not disturbed at all even if the write back operation according to the present invention is ended.

The state of the line in which the write back operation is ended is changed into the clean state. Thus, the cache memory line in which the write back operation according to the present invention is ended does not require the write back operation that occupies the bus of the main memory and leads to the drop of the performance. Hence, the performance of the system can be improved as a whole. The present invention is especially effective in improving the performance of the system using as the main memory SDRAM in which a command can be sent and received at a speed equal to or faster than that of the clock of the processor.

According to the present invention, the empty time of the bus is used to change the dirty cache memory line into the clean cache memory line without dropping the performance of the system. Thus, the performance of the system can be improved as a whole. Its reason is as follows. That is, after the end of the read/write cycle resulting from the cache memory miss hit, it is determined whether or not another tag region corresponding to the row address in its cycle exists and further the cache memory line is dirty. Then, the write back operation is carried out while the row address is fixed. On the other hand, if an access resulting from the other factor occurs, the process is stopped in the middle thereof. Thus, the access is not disturbed.

Moreover, after the end of the read/write cycle resulting from the cache memory miss, the write back operation is carried out while the row address in its cycle is fixed. Thus, differently from the procedure of the conventional write back operation, it is not necessary to again send the row address. As a result, the efficiency of the write back operation itself can be improved as compared with the case of carrying out the write back operation by using the procedure similar to that of the conventional write back operation.

What is claimed is:

1. A computer system comprising:
 a host bus;
 a CPU connected to said host bus;
 a main memory connected to said host bus;
 a cache memory connected to at least one of said host bus and said CPU, said cache memory storing cache data, wherein a tag address and a flag are provided for each of said cache data and said flag indicates one of a clean state in which said corresponding cache data is written back into said main memory and a dirty state in which said corresponding cache data is not yet written back into said main memory; and
 a memory controller connected to said host bus, said cache memory and said main memory, wherein said memory controller writes back dirty write back cache data into said main memory in a continuous write back mode when said host bus is not used, wherein said dirty write back cache data is a part of said cache data stored in said cache memory, and each of said dirty write back cache data is written back and each of said dirty write back cache data includes a predetermined portion in said tag address, wherein said memory controller cancels said continuous write back mode when said CPU accesses said cache memory or said main memory in a memory access using said host bus.

2. A computer system according to claim 1, wherein said CPU accesses said cache memory or said main memory in a memory access using said host bus, and said predetermined portion is a row address of a physical address in the latest memory access.

3. A computer system according to claim 2, wherein said memory controller holds said row address in said continuous write back mode.

4. A computer system according to claim 1, wherein said memory controller includes an address decoder connected to said host bus, wherein said address decoder decodes a logical address on said host bus into a physical address and detects said memory access by said CPU, and
 wherein said memory controller cancels said continuous write back mode when said memory access is detected by said address decoder.

5. A computer system according to claim 4, wherein said predetermined portion is a row address of said physical address in the latest memory access.

6. A computer system according to claim 5, wherein said memory controller holds said row address in said continuous write back mode.

7. A computer system according to claim 3, wherein said memory controller sequentially generates cleaning physical addresses while updating a column address, in said continuous write back mode, each of said cleaning physical addresses including said row address and said updated column address, and writes back said dirty write back cache in said main memory based on said generated cleaning physical addresses, and said tag addresses and said flags corresponding to said dirty write back cache data.

8. A computer system according to claim 7, wherein said memory controller updates said column address immediately when said cleaning physical address does not hit to any of said tag addresses, or when said cleaning physical address hits to one of said tag addresses but said flag corresponding to the hit tag address indicates that said corresponding cache data is in the clean state, and after said writing back of said dirty write back cache data in said main memory when said cleaning physical address hits to one of said tag addresses corresponding to said one dirty write back cache data and said flag corresponding to said one dirty write back cache data indicates that said one dirty write back cache data is in the dirty state.

9. A computer system according to claim 1, further comprising a bus arbiter connected to said host bus, wherein said bus arbiter detects that said host bus is not used, and
 wherein said memory controller sets said continuous write back mode.

10. A computer system according to claim 1, wherein said memory controller detects that said host bus is not used, and sets said continuous write back mode.

11. A memory system comprising:
 a host bus;
 a main memory connected to said host bus;
 a cache memory storing cache data, wherein a tag address and a flag are provided for each of said cache data and said flag indicates one of a clean state in which said corresponding cache data is written back into said main memory and a dirty state in which said corresponding cache data is not yet written back into said main memory; and
 a memory controller connected to said host bus, said cache memory and said main memory, wherein said memory controller writes back dirty write back cache data into said main memory in a continuous write back mode when said host bus is not used, wherein said dirty write back cache data is a part of said cache data stored in said cache memory, and each of said dirty write back cache data is written back and each of said dirty write back includes a predetermined portion in said tag address, wherein said memory controller cancels said continuous write back mode when said host bus is used for a memory access to said cache memory or said main memory.

12. A memory system according to claim 11, wherein said memory controller includes:
 an address decoder connected to said host bus, wherein said address decoder decodes a logical address on said host bus into a physical address and detects that said host bus is used; and
 a controller cancels said continuous write back mode when it is detected by said address decoder that said host bus is used.

13. A memory system according to claim 12, wherein said predetermined portion is a row address of said physical address in the latest memory access, and said controller issues generation control signals in said continuous write back mode,
 wherein said memory controller includes:
 a latch circuit holding said row address; and
 an address generator responsive to said generation control signals to generate cleaning physical addresses while updating a column address, in said continuous write back mode, respectively, each of said cleaning physical addresses including said row address and said updated column address.

14. A memory system according to claim 13, wherein said memory controller includes an address comparator comparing said cleaning physical address and one of said tag addresses and generating one of a cache hit signal or a cache miss hit signal based on the comparing result, and said controller generates said generation control signal each time said cache miss hit signal is outputted from said address comparator or each time said cache hit signal is outputted from said address comparator but said flag corresponding to the cache hit signal indicates the clean state, and after one of said dirty write back cache data is written back in said main memory when said cache hit signal is outputted from said address comparator and said flag corresponding to the cache hit signal indicates the dirty state.

15. A memory system according to claim 14, wherein said memory controller includes:

a selector selecting said physical address outputted from said address decoder when said continuous write back mode is not set, and selecting said cleaning physical address generated by said address generator when said continuous write back mode is set.

16. A method of keeping a cache memory clean in a computer system comprising said cache memory, a main memory and a memory controller which are connected to a host bus, said cache memory storing cache data, wherein a tag address and a flag are provided for each of said cache data and said flag indicates one of a clean state in which said corresponding cache data is written back into said main memory and a dirty state in which said corresponding cache data is not yet written back into said main memory, said method comprising:

setting a continuous write back mode when said host bus is not used by said memory controller;

writing back dirty write back cache data into said main memory in said continuous write back mode by said memory controller, wherein said dirty write back cache data is a part of said cache data stored in said cache memory, and each of said dirty write back cache data is written back and each of said dirty write back cache data includes a predetermined portion in said tag address; and canceling said continuous write back mode when said host bus is used for a memory access to said cache memory or said main memory by said memory controller.

17. A method according to claim 16, wherein said canceling includes:

detecting use of said host bus based on a logical address on said host bus, said logical address being decoded into a physical address.

18. A method according to claim 16, wherein said predetermined portion is a row address of said physical address in the latest memory access, and wherein said writing back includes:

holding said row address in said continuous write back mode; and responding generation control signals to sequentially generate cleaning physical addresses while updating a column address, in said continuous write back mode, respectively, each of said cleaning physical addresses including said row address and said updated column address.

19. A method according to claim 16, wherein said writing back includes:

comparing said cleaning physical address and one of said tag addresses;

generating one of a cache hit signal or a cache miss hit signal based on the comparing result; and generating said generation control signal each time said cache miss hit signal is outputted from said address comparator or each time said cache hit signal is outputted from said address comparator but said flag corresponding to the cache hit signal indicates the clean state, and after one of said dirty write back cache data is written back in said main memory when said cache hit signal is outputted from said address comparator and said flag corresponding to the cache hit signal indicates the dirty state.

20. A method according to claim 17, further comprising:

selecting said physical address obtained from said logical address when said continuous write back mode is not set; and selecting said cleaning physical address when said continuous write back mode is set.

* * * * *